March 30, 1937.    H. B. RING    2,075,227
SOLDERING IRON AND ACCESSORIES
Filed Aug. 20, 1934    4 Sheets-Sheet 2
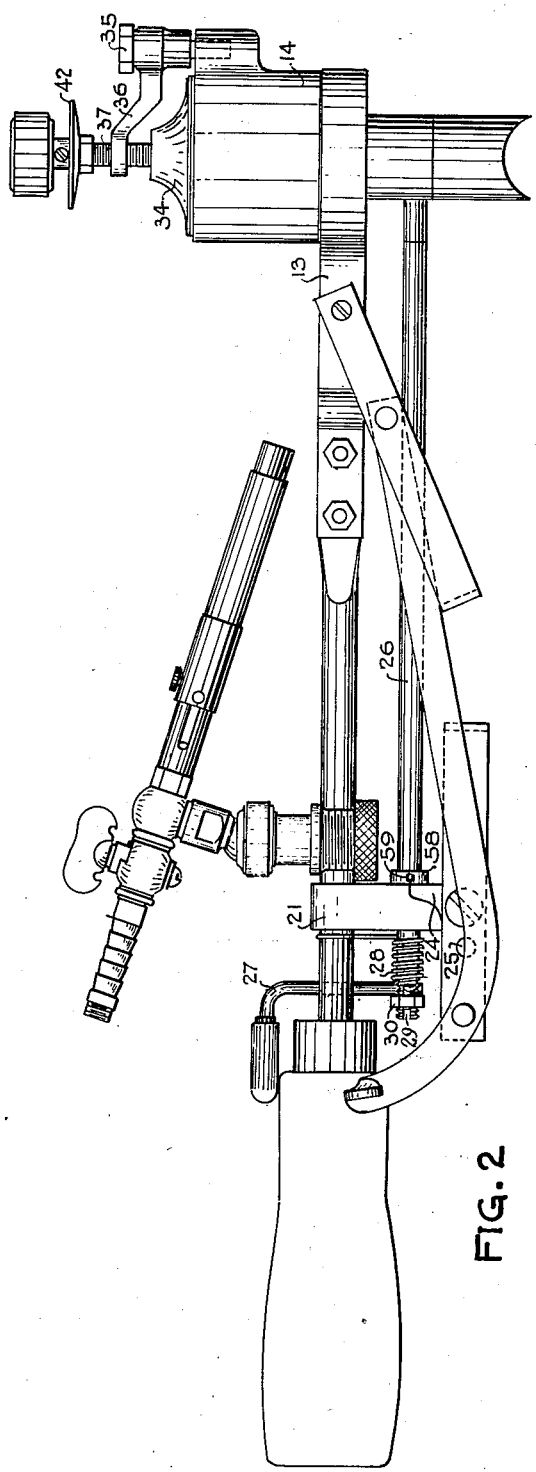
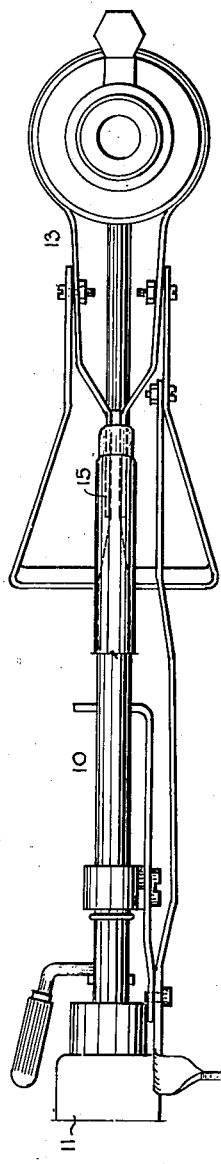
INVENTOR.
HAROLD B. RING
BY
ATTORNEY.

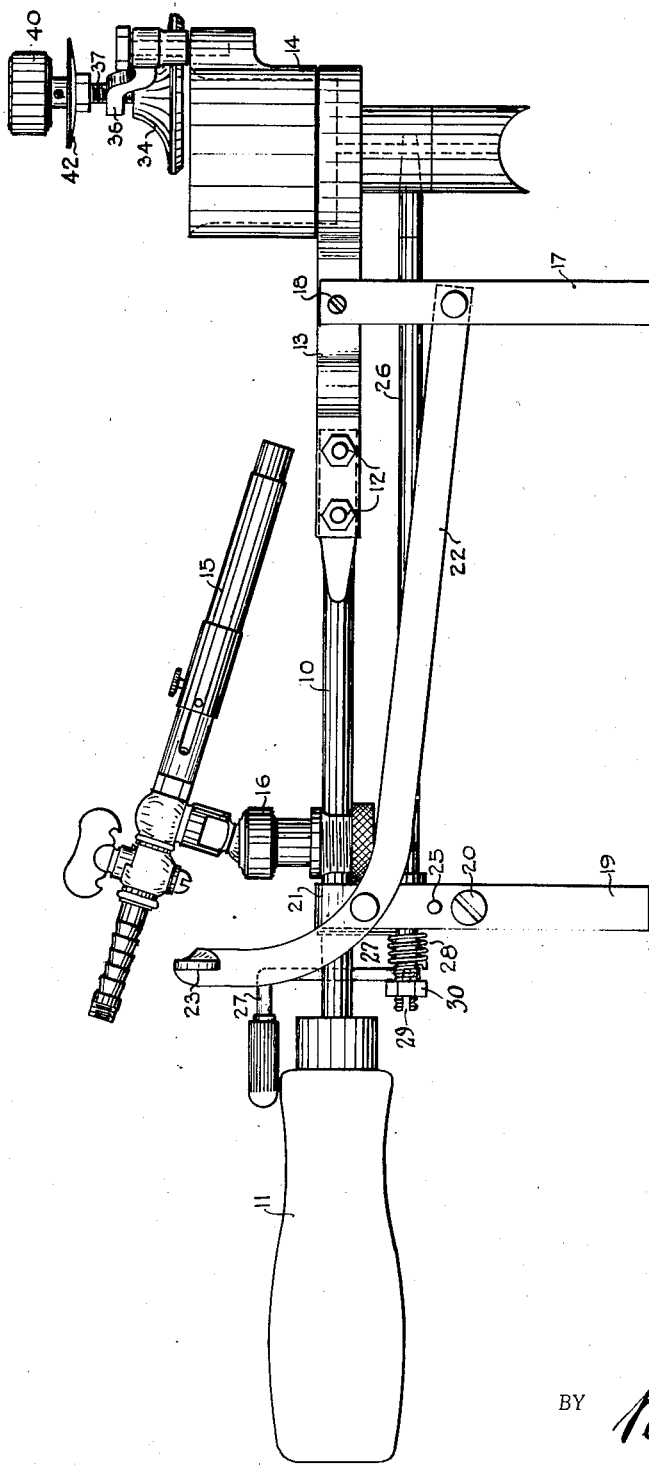

March 30, 1937. H. B. RING 2,075,227
SOLDERING IRON AND ACCESSORIES
Filed Aug. 20, 1934 4 Sheets-Sheet 4
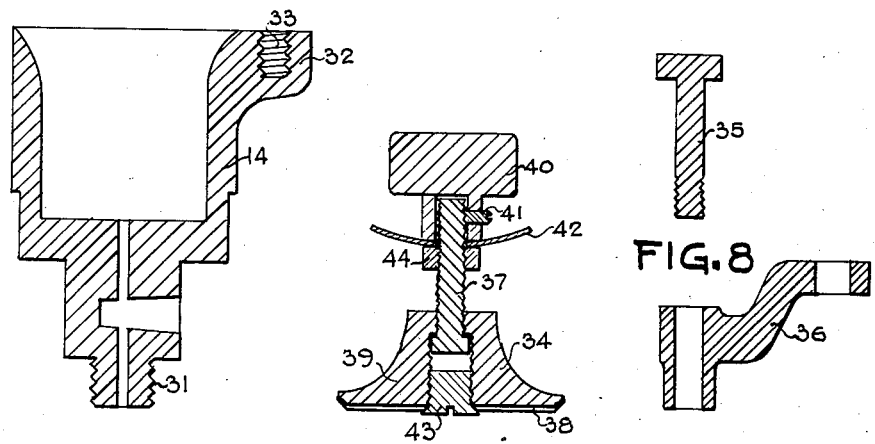
FIG. 6  FIG. 7  FIG. 9
FIG. 8
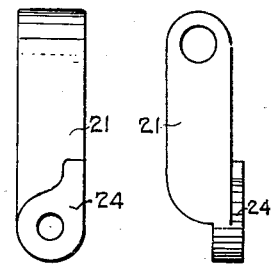
FIG. 10  FIG. 11
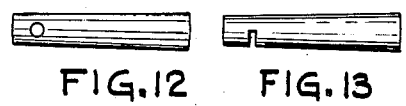
FIG. 12  FIG. 13
FIG. 14  FIG. 15
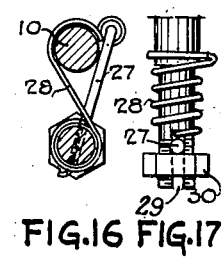
FIG. 16  FIG. 17
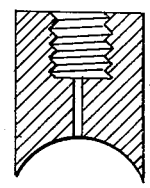
FIG. 18
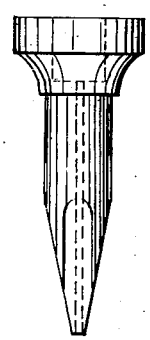
FIG. 19
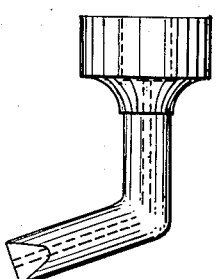
FIG. 20
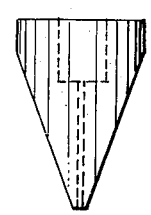
FIG. 21
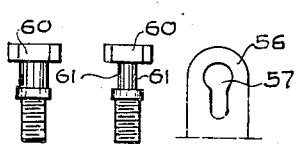
FIG. 22  FIG. 23  FIG. 24
INVENTOR.
HAROLD B. RING.
BY
ATTORNEY.

UNITED STATES PATENT OFFICE 2,075,227

SOLDERING IRON AND ACCESSORIES

Harold B. Ring, Brooklyn, N. Y.

Application August 20, 1934, Serial No. 740,577

5 Claims. (Cl. 113—105)

This invention relates to new and useful improvements in soldering irons and accessories used in connection therewith, and it has for its main object the provision of a soldering iron, which is comparatively simple of construction, durable, of a convenient and most suitable shape, and very easy to manipulate in the performance of soldering work.

The present invention constitutes further improvements of an invention, for which the U. S. patent was granted under No. 1,934,885, November 14, 1933.

Thus the soldering iron described herein, may well, in view of the perfection in construction, and the numerous features embodied therein ready to meet any contingency, be termed a self serving soldering iron, as the latter has been correctly designed for steady production and constant delivery of ample heat. In addition, this soldering iron has been equipped with the most modern and up-to-date attachments of various styles for the different kinds of work, thereby making any soldering job a delight instead of a burdensome and tedious task.

Thus the soldering process is a one hand operation, with my present device, leaving the other hand free to adjust the work, as you go along thereby speeding up the production. A specially made combination gas burner is attached to the iron, so as to make it possible to use the iron everywhere with the different kinds of gases.

The soldering iron is well balanced and fits the hand comfortably, while the cylindrically shaped chamber, which has a tight-fitting lid mounted thereon, contains the solder. As the flame from the combination gas burner is appropriately directed at the chamber and soldering point, only a few minutes are required before the iron is fully ready for operation.

The flow of solder from a molten solder reservoir, forming an important part of the soldering iron, is regulated by a specially constructed valve, which is mounted in such a manner as to be actuated and controlled by the mere touch of a finger. By opening the valve the solder runs freely from the chamber producing a perfect, strong and permanent soldering joint.

The soldering iron is constructed in such a manner, that each part may easily be replaced or fixed.

With the above and other objects in view, this invention consists of the novel features of construction, combination and arrangement of parts, hereinafter fully described, claimed and illustrated in the accompanying drawings forming part of this specification, and in which similar characters of reference indicate corresponding parts in all views, and in which:

Figure 1 is a side elevational view of a hatchet type soldering iron mounted upon a stand, forming an integral part with the latter, with the lid of the soldering chamber open, and showing a characteristically formed soldering point.

Figure 2 is a view similar to Figure 1, but with the stand folded up, the lid closed and the device ready for operation.

Figure 3 is a top plan view of the invention, shown in the Figures 1 and 2, illustrating detail features, and especially the relative arrangement of the burner tube and soldering chamber.

Figure 6 is a transverse sectional view of a solder container.

Figure 7 is a transverse sectional view of the lid of the latter; while

Figure 8 illustrates a screw bolt.

Figure 9 shows a knee-bent shank.

Figures 10 and 11 illustrate different views of a bracket member.

Figures 12, 13, 14 and 15 show different forms of valve points.

Figure 16 shows the relative arrangement of a valve and an operating handle.

Figure 17 shows the co-operation of a spring with a valve.

Figures 18, 19, 20 and 21 show differently constructed soldering points; while the Figures 22, 23 and 24 are further detail views, illustrating essential features embodied in the construction of the straight type soldering iron with its cooperating stand, as will be hereinafter more fully described.

Figures 4, 5:
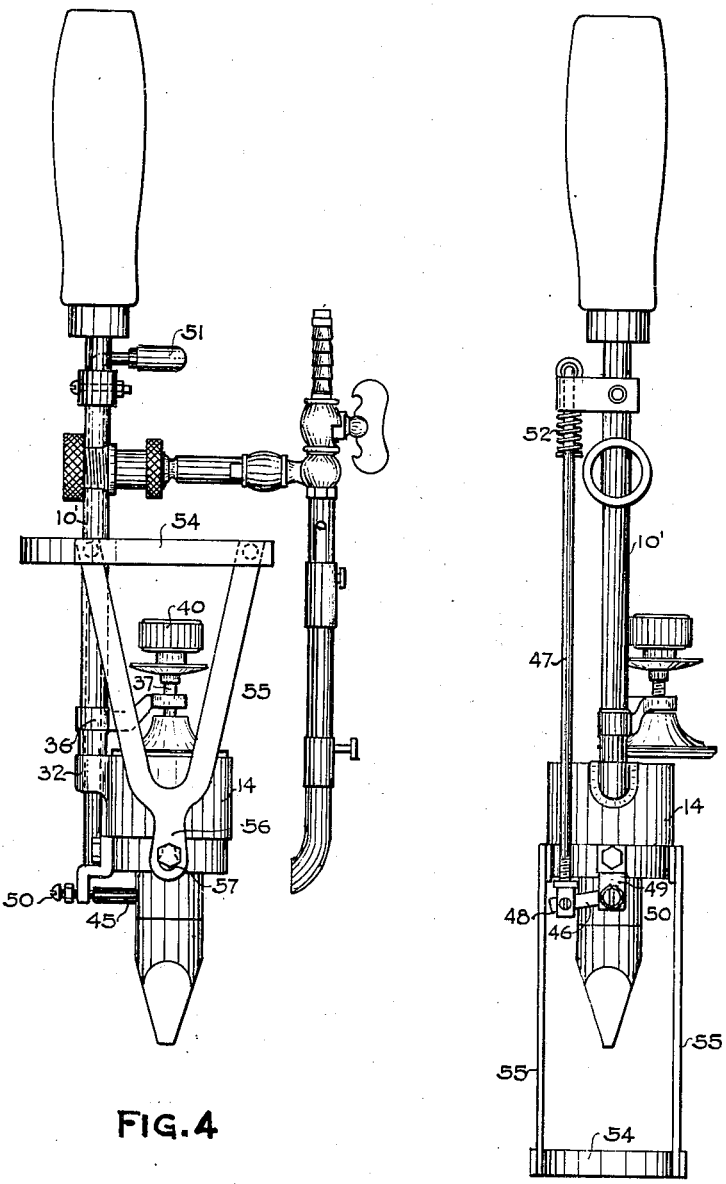
Figure 4 is a side elevational view of a straight type soldering iron with the stand folded up and ready for use.
Figure 5 is another side elevational view of the device, shown in Figure 4, illustrating the said device placed upon a stand and with the lid of the solder chamber open.

Referring more particularly to Figure 1 in the drawings, 10 indicates a bar, which has a handle 11, mounted upon one end thereof, while the other end terminates in an extension or flattened portion to which is attached by means of screws or bolts, as shown at 12, a substantially rectangularly shaped member 13, which in turn is bent upon itself to form a seat therein for the solder container 14. On top of said bar 10 is mounted a burner tube 15, so arranged by means of a knee joint 16, that said burner tube may be appropriately adjusted with respect to the solder container, to the effect that said tube may be raised or lowered, as desired.

Below the bar 10 and integral with the device proper has been mounted a foldable stand; which comprises a forwardly arranged member 17, the latter consisting of a flat metal strip bent upon itself and pivotally secured to the member 13, as shown at 18. Another member 19 has been rearwardly attached in a pivotal manner by means of a screw bolt 20, to a bracket 21, which in turn is mounted on the bar 10. A lever 22 terminating in an operable finger piece 23 connects the members or feet 17 and 19 together and serves to manipulate the stand in opening or closing the latter.

In order, however, to secure the said stand, when opened, in the proper position and prevent the feet 17 and 19 to spread out too far, a projection 24, as may be seen in Figure 2, has been formed on the bracket 21, so that in opening the stand said projection will be engaged by a short screw-bolt 25 disposed upon the upper part of the leg 19, as shown in Figure 1.

The valve rod 26, which coacts with the soldering container, is operated by a handle 27. The said valve rod is actuated by a spring 28 one end of which is fastened to the handle bar 10, while the other end of said spring is securely held in a specially constructed slot 29 in the end of the valve rod 26, as may be seen especially in the detail view Figure 17; said spring 28 is held in position in said slot by means of a nut 30; the valve control handle 27 being also fitted or inserted into the same slot 29 thereby further securing a tight grip on the spring. The arrangement thus described will make it evident that said spring may, when desired, easily be exchanged.

The arrangement of the spring thus described, pertains to the device, as shown in Figure 1.

As shown in Figure 2, a nut 58 secured by a set screw 59 has been mounted upon the valve rod 26 in front of the bracket 21 for the purpose of keeping said valve rod 26 in proper position relative to the solder container.

The solder container 14 is made in one solid piece with a threaded lower point, as shown at 31 in Figure 6, which point is adapted to have different soldering points, such as shown in the Figures 18, 19, 20 and 21, screwed thereto.

While the solder container 14, as shown in Figure 1, is seated upon and solidly secured to the bar 13, said container is in the modifications shown in the Figures 4 and 5 mounted directly upon the handle bar 10'. The solder container is formed with the usual outlet, and reduced space therein adapted to receive the valve, and it has upon its side been provided with a projecting portion 32 formed with a threaded opening 33 therein, as may especially be seen in the detail view Figure 6.

The said projection 32, as described, serves in the embodiment, shown in the Figures 1 and 2 to attach the lid or cover 34 pivotally to the solder container by means of a hexagonal screw bolt 35, shown in detail view in Figure 8, which screw bolt enters the threaded opening 33 in said projection.

In the embodiment shown in Figures 4 and 5, the handle bar 10' is directly attached to the solder container 14 by having its end portion secured in the opening 33 of the projection 32 of the container. A knee-bent shank 36, shown in detail in Figure 9, pivotally connects the stem 37 of the lid to the screw bolt 35, or handle bar 10' in the different embodiments, shown in the Figures 1 and 4, respectively.

The lid 34 of the container, comprises a lower closure-member 38, made of any suitable material, and which is secured by means of a screw 43 to a disk member 39, although said closure member and disk may be made in one piece; a threaded stem 37 or screw is in turn secured to said disk, while it has upon its other end portion been provided with a bakelite knob 40, the latter being secured to the said stem 37 by means of a set screw 41. Below the said knob 40, a shield 42 has been mounted upon the said stem 37 to protect the knob 40 from being overheated, when the solder in the container has been heated to the melting point. A screw-nut 44 is threaded upon the stem 37 to secure the shield 42 in proper position.

In the straight type soldering iron, shown in the Figures 4 and 5 the container has been mounted on the handle bar 10', as formerly described. The valve 45 is operated by a lever arrangement comprising a short arm 46, which has one end connected to the said valve in any suitable manner, and the other end connected to a longer arm 47, by means of a sleeve joint shown at 48. A supporting bracket which has a screw 50 inserted therethrough and forming a pivotal engagement with the said valve proper, has been shown at 49. The arm 47, which terminates a handle 51, is actuated by a spring, as shown at 52.

The straight type soldering iron is shown in Figure 4 with a stand attachment folded thereon, while in Figure 5 the said soldering iron is shown placed upon the stand in the unfolded position of the latter. The said stand, which consists of a foot piece 54, has the legs 55, which are integral with the latter, joined at their top upon each side of the container 14. A lug-portion 56, which in turn has been formed with an opening 57 therein somewhat similar to a keyhole, as shown in Figure 24, is adapted to engage studs 60 arranged upon each side of the container. The said studs are formed with flat surfaces upon two sides, as shown at 61 in Figure 23.

It will thus become evident, in viewing the relative arrangement of said studs 60 with the key hole opening 57, that when the stand is folded upon the soldering iron, as shown in the Figures 4 and 5, said stand will by lifting upwardly slightly be free to be swung into position for supporting the soldering iron, whereas by a downwardly jerking movement the said stand may from said latter position at any time be swung back to closed or folded position in which latter position it will stay locked.

The Figures 12, 13, 14 and 15 show valve points with differently constructed openings therein; each one of these valve points may be mounted on the end of the member 26, and is turned through a portion of a revolution by means of the handle 27, while Figures 18, 19, 20 and 21 show differently constructed soldering points, of which the point with the half-moon construction, as shown in Figure 18, is especially adapted for pipe and wire soldering work.

In the Figures 10 and 11 have been shown in detail the bracket 21, especially referred to in connection with Figure 2.

It is obvious that changes may be made in the form, construction and arrangement of the several parts, as shown, within the scope of the appended claims, without departing from the spirit of the invention, and I do not therefore, wish to limit myself to the construction and arrangement shown and described herein.

What I claim as new, and desire to secure by Letters Patent of the United States, is:

1. In a device of the class described, the combination of a soldering iron with a stand, comprising, a handle bar, a solder-container, means for securing the latter to the handle bar, a bracket mounted upon said handle bar, the stand having its legs pivotally attached to the aforesaid means, and bracket, respectively, a projection upon said bracket and a screw bolt upon one of the legs coacting with said projection to secure the stand in unfolded position, a valve rod arranged through said bracket for cooperation with the solder container, and means mounted upon said valve rod, whereby to manipulate the latter.

2. A hatchet type soldering iron having a handle bar, an extension upon the latter, a soldering container supported by said extension comprising a one piece receptacle formed with a projection thereon, the latter having a threaded hole therein, a hexagon bolt fitted in said hole, a lid pivotally secured to said hexagon bolt, a knee-bent member for attaching the latter to the hexagon bolt, said lid comprising a stem, a closure-member fitted to one end of said stem and a bakelite operating knob to the other end, and a heat-protecting shield below said knob, means for securing said knob and shield in relatively adjusted position, and further means for supporting the iron, when the latter is not in actual operation by hand, said latter means consisting of a foldable stand integral with said soldering iron, and means for operating the stand, substantially as shown and described.

3. A hatchet type soldering iron having a handle bar, an extension upon the latter, a soldering container supported by said extension, a bracket integrally mounted upon the handle bar, a valve-rod accommodated by said bracket, a folding stand, the latter comprising a pair of legs, one of said legs being pivotally secured to said extension and the other leg to the bracket, a projection upon the latter, and a stud upon the leg attached to the bracket, whereby to secure the stand in solid position, when unfolded, a cross-bar terminating in a finger piece pivotally connecting said legs, and serving to manipulate the opening and closing of the stand.

4. In a hatchet type soldering iron, a base-member formed with a handle thereon, a soldering container supported by said base-member, a bracket integrally mounted upon the latter and adapted to accommodate a valve-rod, a folding stand, the latter comprising legs, one of said legs being pivotally connected to the base-member, and another leg to the bracket, a projection upon the latter, and a stud upon the leg attached to the bracket, whereby to limit the outwardly movement of the legs in opening the stand, a cross-bar terminating in a finger-piece and pivotally connecting the legs together and serving to fold and operate the stand.

5. In a straight type soldering iron, a handle bar, a soldering container mounted upon one end thereof, a lid swingably secured upon said handle bar above the container, a burner tube adjustably attached to the handle bar, a rod, a bracket for connecting said rod to the handle bar, a spring cooperating with said rod, means for connecting said rod to a valve, and a foldable stand connected pivotally to the soldering container, said stand comprising a foot-piece having legs integrally mounted thereon, and means for connecting said legs to the soldering container.

HAROLD B. RING.